A. O. TATE.
APPARATUS FOR TREATING LIQUIDS ELECTROLYTICALLY.
APPLICATION FILED JULY 3, 1907.

991,760.

Patented May 9, 1911.

2 SHEETS—SHEET 1.

WITNESSES:

INVENTOR
Alfred O. Tate
By his Attorney,

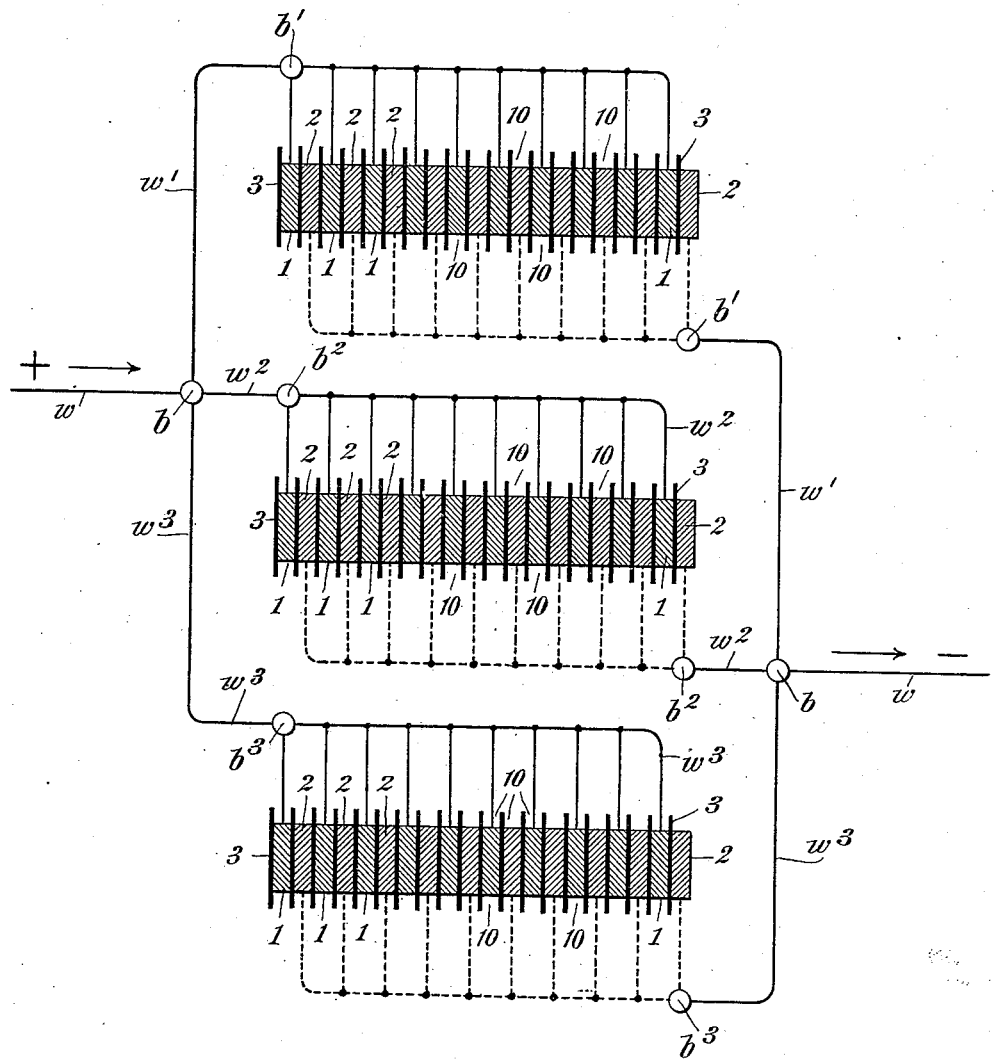

UNITED STATES PATENT OFFICE.

ALFRED O. TATE, OF TORONTO, ONTARIO, CANADA.

APPARATUS FOR TREATING LIQUIDS ELECTROLYTICALLY.

991,760. Specification of Letters Patent. Patented May 9, 1911.

Application filed July 3, 1907. Serial No. 382,120.

*To all whom it may concern:*

Be it known that I, ALFRED O. TATE, a subject of the King of Great Britain, residing in Toronto, Ontario, Dominion of Canada, have made a new and useful Invention in Apparatus for Treating Liquids Electrolytically, of which the following is a specification.

My invention is directed particularly to an improvement upon inventions disclosed in prior patents granted to me on the 25th day of June, 1907, numbered 857,909 and 857,910 and it has for its object, to increase the rate of precipitation of matter in solution for the expenditure of a definite amount of electrical energy.

Figure 1:
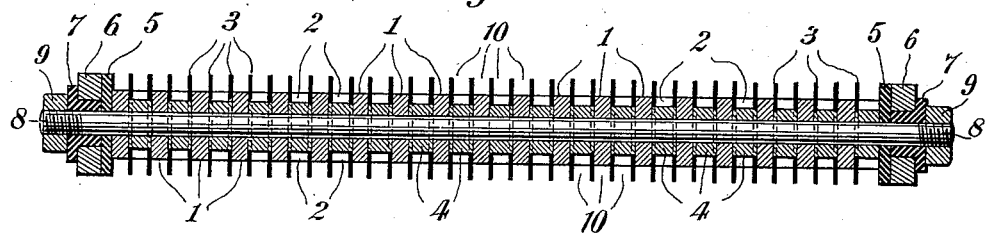
Figure 2:
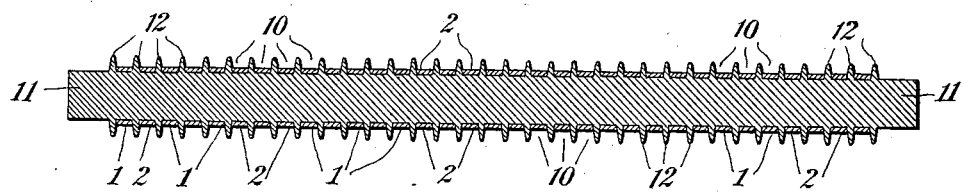

My invention has an especial utility in connection with the purification of water, or the treatment of liquids generally wherein it is proposed to remove substances held in solution and precipitated by or through the agency of an electrical current, and will be fully understood by referring to the drawings, in which, Figure 1 is a transverse sectional view taken through the upper portion of an electrode plate like that disclosed in the first named patent, with the present improvement as applied thereto. Fig. 2 is a similar transverse sectional view taken through the body of an electrode like that disclosed in the second named patent, with the present improvement applied thereto; Fig. 3 is a diagrammatic view illustrating three electrode plates in multiple circuit with current mains, the electrodes themselves being shown in transverse sectional view through the central portions thereof and illustrating the present improvement as applied thereto.

Referring now to the drawings in detail in which like numerals and letters of reference represent like or equivalent parts wherever used, and first to Fig. 1, 1, 1, 2, 2, represent the interleaved anodes and cathodes arranged upon and connected alternately to a pair of conducting rods 8, 8, one at each end of the electrode and separated from each other by strips of insulating material 3, 3, and spaced at the opposite ends by conducting washers 4, 4; 5, 5, being insulating blocks at the outer sides of the electrodes and 6, 6, metallic binding bars; 7, 7, being insulating washers and 9, 9, nuts on the two rods for holding the same together, all of the parts so far described being identically like those disclosed in the first of the before-mentioned patents, except that in the prior patent the width of the insulating strips 3, 3 is identically the same as the width of the anodes and cathodes, whereas in the present improvement the width of these strips is increased for the purpose of producing vertically disposed channels or compartments 10, 10, on both faces of the electrodes.

Referring now to Fig. 2 of the drawings there is illustrated here a cross sectional view of an electrode plate like that disclosed in the second of the before-mentioned patents, in which 11 represents an insulating base and 12, 12, 12 a series of ridges or elevations, 1, 1, 1 being the anodes and 2, 2, 2, the cathodes consisting of thin strips of platinum or other good conducting material secured therein, the electrode in this form of the invention being identically like that disclosed in the second before-mentioned patent, except that the ridges 12, 12, 12 are of such dimensions as to form channels or compartments 10, 10, 10, like those disclosed in Fig. 1, the function being the same, and this feature constitutes my improvement as applied to the electrode in the second before-mentioned patent.

I have ascertained during the treatment of water highly charged with alkaline salts with electrode plates like those disclosed in both of the before-mentioned patents that where the edges of the insulating strips 3, 3, 3, Fig. 1, or of the ridges or elevations 12, 12, 12, Fig. 2 between the anodes and cathodes 1, 1, 1, 2, 2, 2, are flush with the faces of said anodes and cathodes, the acid and alkaline solutions formed respectively thereon tend to neutralize each other to a marked extent by a mechanical intermixture induced by the ascending gases, and that this neutralization reduces the rate of precipitation of the metallic salts from the solution being acted upon. I have learned from this action that in order to secure the highest rate of precipitation; that is to say, the maximum number of grains per ampere unit, it is essential to provide means for avoiding, as far as practicable, this intermixture of these acid and alkaline solutions, and I accomplish this result by extending the insulating strips 3, 3, Fig. 1 and the ridges or elevations 12, 12, 12, Fig. 2, laterally between the anode and cathode strips so as to form, as before described, a series of vertically disposed channels or compartments 10, 10, 10 which will permit the gases to ascend without intermixing the two aforesaid solutions. In other words, by this improvement I attain the best results by insulating from each other the individual volumes of electrolyte that are being acted upon by the current, and this feature constitutes the essence of the present improvement.

In Fig. 3, I have shown diagrammatically how three such electrode plates as are disclosed in Fig. 1 may be connected in multiple relation with two current mains $w$, $w$, $w^1$, $w^2$, $w^3$ being branch conductors connected respectively to the anodes illustrated in Fig. 1 by the conducting rod 8, and to a binding post $b^1$, and connected in like manner to the cathodes by dotted lines and a similar conducting rod 8, as shown in Fig. 1, to the binding post $b^1$, the connection by the conductors $w^1$ and $w^3$ to the anodes and cathodes and binding posts $b^2$ and $b^3$ being clearly illustrated, the dotted lines illustrating the connections from all three electrode plates from the bottom thereof.

I do not limit my invention to the specific forms shown in the drawings, as the same may be departed from materially and still come within the scope of my claims hereinafter made. In other words, I believe it is broadly new with me to provide an electrode for an electrolytic cell, no matter what the type thereof, with means for minimizing the intermixture of the acid and alkaline solutions after separation thereof has been effected; or for maintaining a more constant rate of precipitation of matter dissociated from an electrolyte through the agency of such electrolytic cell.

Having thus described my invention what I claim and desire to secure by Letters Patent of the United States is—

1. An electrode for an electrolytic cell embracing vertically disposed anodes and cathodes separated from each other by insulating material and provided with vertically disposed gas conducting channels located on both faces thereof, substantially as described.

2. An electrode for an electrolytic cell embracing alternately disposed anodes and cathodes, and vertically disposed channels for conveying the gases upward and minimizing the intermixture of the acid and alkaline solutions after they have been separated from the electrolyte, substantially as described.

3. An electrode for an electrolytic cell embracing alternately disposed anodes and cathodes separated from each other by insulating media, the edges of which project beyond the edges of said anodes and cathodes so as to form channels for maintaining a more constant rate of precipitation of the solids held in solution in the electrolyte, substantially as described.

4. An electrode for an electrolytic cell embracing interleaved strip-like anodes and cathodes separated from each other by insulating strips which extend beyond the edges of said anodes and cathodes and form channels; in combination with means for binding said parts all together so as to form a plate having an electrolytic surface on either side face, substantially as described.

5. An electrode for an electrolytic cell in the form of a plate made up of a series of anodes and a series of cathodes closely interrelated electrically and provided with circuit connections for connecting all of the anodes to the positive and all of the cathodes to the negative pole of an electrical generator, the effective surfaces of said anodes and cathodes being located in channels adapted to convey the gases upward as electrolytic action proceeds and to permit of a maximum rate of precipitation of the solids held in solution in the electrolyte, substantially as described.

In testimony whereof I have signed my name to this specification in the presence of two subscribing witnesses.

ALFRED O. TATE.

Witnesses:
M. TURNER,
M. F. KEATING.

---

Copies of this patent may be obtained for five cents each, by addressing the "Commissioner of Patents, Washington, D. C."